July 9, 1968 E. O. CAIN 3,392,284
PHOTOSENSITIVE POWER CONTROL CIRCUIT FOR
USE WITH ARC TYPE LAMPS
Filed Sept. 30, 1964 2 Sheets-Sheet 1

INVENTOR
Ernest O. Cain
BY
[signature]
ATTORNEY

INVENTOR
Ernest O. Cain
BY
[signature]
ATTORNEY 3,392,284
Patented July 9, 1968

3,392,284

PHOTOSENSITIVE POWER CONTROL CIRCUIT FOR USE WITH ARC TYPE LAMPS

Ernest O. Cain, Dallas, Tex., assignor to Hunt Electronics Company, Dallas, Tex., a corporation of Texas Filed Sept. 30, 1964, Ser. No. 400,478
13 Claims. (Cl. 250—214)

ABSTRACT OF THE DISCLOSURE

There is disclosed apparatus for controlling the application of power to lighting devices in which there is provided a semiconductor switching device having two power electrodes. The switching device is a semiconductor device which may either be a silicon control rectifier, a gated symmetrical switching device, or a symmetrical switching diode. There is also provided a thermally actuated switch which permits the application of a control signal to the switching device to cause the switching device to switch to a low impedance state when the contact of the thermally actuated switch is closed. A second switching device is provided for controlling the flow of current through a heater element of the thermally actuated switch such that the contacts of the thermally actuated switch will be open after the second switching device has permitted current flow for at least a minimum length of time. A condition responsive element, suitably a photosensitive device, controls the application of a control signal to the second switching device.

It is oftentimes desirable to control the power applied to a load in accordance with the ambient conditions present. Thus, for example, street lights are often automatically turned on at dusk and turned off at dawn. Outside lighting utilized for protection and similar purposes is also similarly operated.

The lighting loads operated in this manner are usually provided either for security or safety purposes, and reliability of operation is extremely important. Further, since there may be quite a large number of lighting devices involved, substantial power savings can be achieved by only burning the light at those times when the light is required.

Several types of controls for accomplishing the above desired functions have been suggested and used. Thus, relays which are actuated by photosensitive elements have been used quite extensively. However, the current transients produced when the relays are opened or closed are quite large and frequently burn the relay contacts. Considerable expense is thereby involved in replacement of the relay contacts and, in addition, the reliability of operation leaves much to be desired.

Various types of solid state devices have also been used for controlling the power applied to lighting loads. With such a device, it is practical to control the effective power applied to the lighting device in accordance with the intensity of the ambient light. Since full power can be applied to the incandescent lighting device over a period of several minutes as the sky is darkened, the lighting device is able to warm up rather slowly, prolonging the life of the device. Further, maximum economy of operation is achieved and the amount of light produced is controlled by ambient conditions. Thus, for conventional incandescent lamps, the solid state devices have proved very successful.

Helium vapor lamps and other types of arc lamps have been accorded an extremely wide degree of acceptance in certain lighting applications, and they are employed almost exclusively for street and highway lighting. There is, however, one principal difference between the arc type lamp and the more common incandescent lamp which renders the conventional power control circuitry unsuitable for use in controlling the helium vapor and similar arc type lamps. Namely, these lamps utilize an auxiliary starting electrode. In the event one of these lamps should be extinguished, a waiting period of approximately five minutes is required before the arc type lighting device can again be lit. Thus, if at night an electrical storm should occur, flashes of lightning will often be bright enough to signal the photocells used in the more conventional solid state and relay circuitry to remove power from the load. Once the light is removed, the lighting device cannot be lit without the necessary waiting period. The passing of automobiles with high intensity headlights characteristics of the modern automobile may also produce this undesirable result.

The present invention obviates the undesirable results obtained when conventional solid state controls utilizing photocells are attempted to be used for such lighting applications. In accordance with the present invention, a switching type device, that is a device which is capable of being switched from a normally high impedance state to a low impedance state responsive to the presence of a control signal, is connected in circuit with a source of alternating current supply voltage and the lighting device. Means including a condition responsive element is connected for applying a control signal to the thyratron type device, said means being effective only when said condition responsive element is in one condition. The condition responsive element is one which switches from the one condition to a second condition responsive to the occurrence of a condition but in which a predetermined time delay is provided in the switching action. In accordance with the preferred embodiment of the invention, the first condition responsive element is a thermally actuated switch. Means including a second condition responsive element are provided for engaging said first condition responsive element to the other condition. The second condition element, in this instance, is a photocell.

Many objects and advantages of the invention will become apparent to those skilled in the art as the following detailed description of certain preferred embodiments of the same unfold when taken in conjunction with the drawings wherein like reference numerals denote like parts and in which:

FIGURE 1 is a schematic diagram illustrating one embodiment of the invention;

FIGURE 2 diagrammatically illustrates the structure of the device utilized in the circuit of FIGURE 1;

Figure 1:
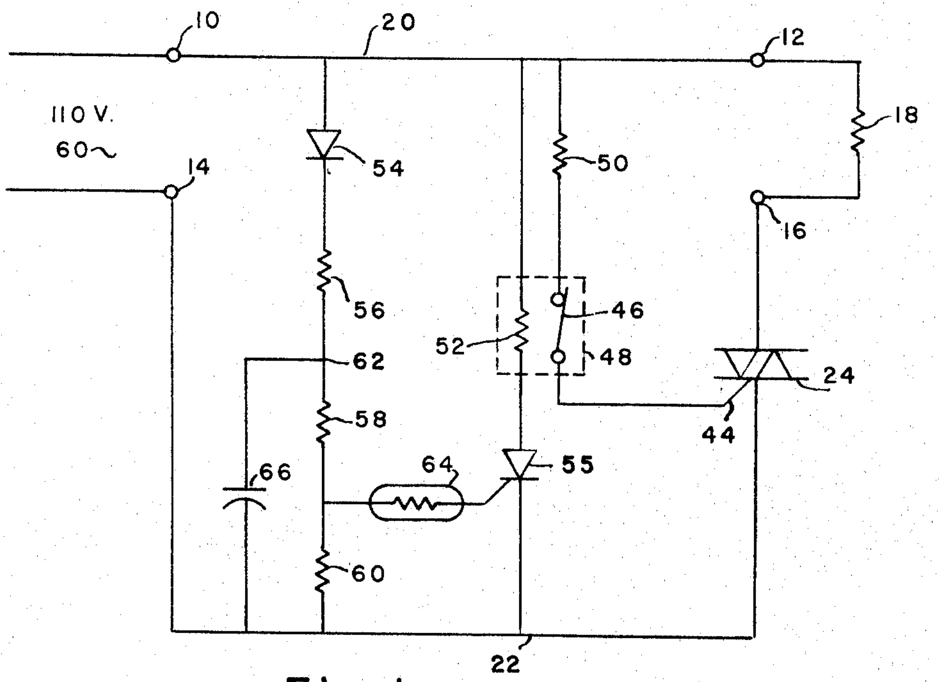

Turning now to FIGURE 1 of the drawings, the control circuit of the present invention suitably includes four terminals 10, 12, 14 and 16. The terminals 10 and 14 are adapted to be connected to a source of alternating current supply voltage, suitably 110 volts 60 cycle. The terminals 12 and 16, on the other hand, are adapted to be connected to the load 18 which is to be controlled. As indicated previously, the load 18 is suitably a mercury vapor lamp. Terminals 10 and 12 are connected by connector 20. Terminals 14 and 16 are connected by connector 22 and thyratron type device 24.

Figures 2, 3:
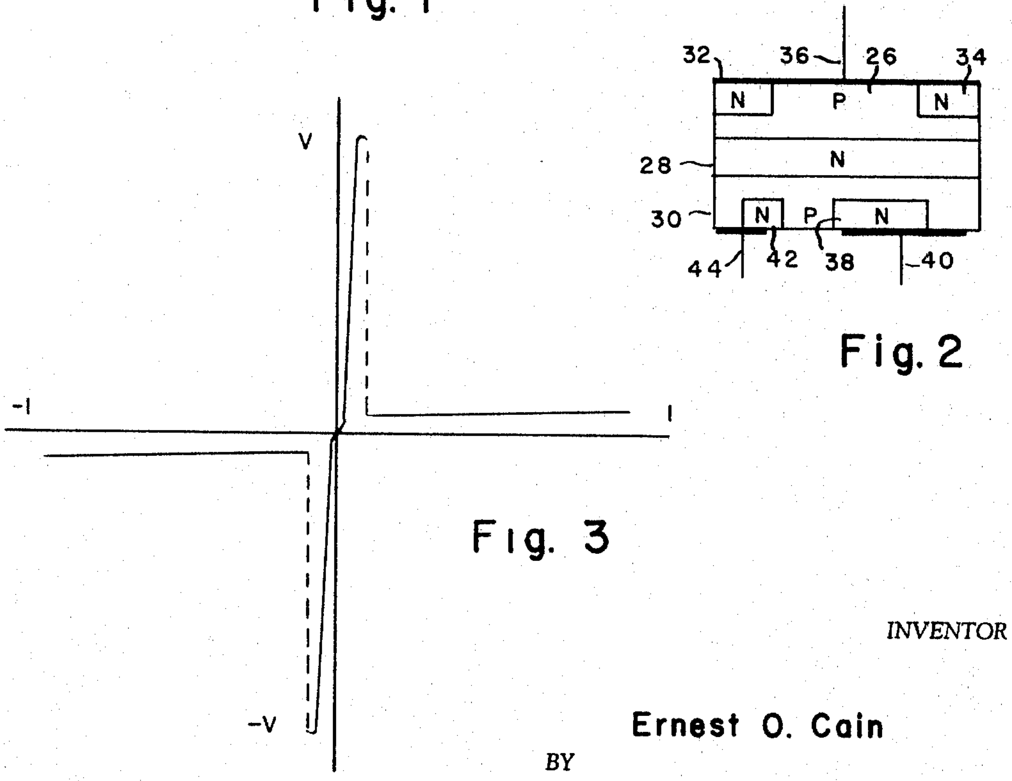
FIGURE 3 is a curve illustrating the breakdown characteristics of the devices used in practicing the invention.

The device 24 of FIGURE 1 is as shown in FIGURE 2 and is known as a Triac. The structure of the device 24 is shown in FIGURE 2 and can be seen to comprise three principal layers 26, 28 and 30, layers 26 and 30 being of P-type conductivity and layer 28 being of N-type conductivity. Two N-type regions 32 and 34 are formed in the surface of the P-type layer 26 as shown. The electrode 36 contacts each of the layers 26, 32 and 34. An N-type region 38 is formed in the surface of the P-type layer 30 and the second power electrode 40 contacts both the N-type region 38 and the P-type layer 30. A smaller N-type region 42 is also formed in the surface of the P-type layer 30, with the gate electrode 44 contacting both the region 42 and the layer 30.

It can therefore be seen that the structure of the Triac comprises a P-N-P-N switch in parallel with an N-P-N-P switch between terminal 1 and terminal 2. The gate region is a more complex arrangement which may be considered to operate in any one of four modes: a direct gate of the normal SCR; a junction gate of the normal SCR; a remote gate of complementary SCR with positive gate drive; and a remote gate of complementary SCR with negative gate drive.

The breakdown characteristics of the device 24 is as shown in FIGURE 3. Thus, the device normally exhibits high impedance to the passage of current in either direction. However, by applying a voltage of the proper polarity to the gate electrode 42, the device can be caused to switch to a low impedance state to allow the flow of current in a desired direction. For more detailed information upon the characteristics of the Triac device, reference may be had to application Note 200.35 dated May 1964, entitled, "Triac Control for AC Power," by E. K. Howell, published by the Rectifier Components Department of the General Electric Company.

Turning again to the description of the circuit shown in FIGURE 1 of the drawing, the gate electrode 44 of the device 24 is connected through the normally closed element 46 of a thermally actuated switch 48 and a resistor 50 to conductor 20. Thus, if the load 18 is connected to terminals 12 and 16 are a source of alternating current supply voltage is connected to terminals 10 and 12, so long as the contact 46 of switch 48 is closed, gate voltage will be applied to the gate 44 of Triac 24 and very early in each half cycle of alternating current supply voltage, the device 24 will be switched to its low impedance state, permitting current to flow through the load 18. However, if the switch 48 opens, gate current will not be applied to the device 24 and it will remain in its high impedance state, preventing the flow of current through the load.

The switch 48, as mentioned previously, is of the thermally actuated type with the element 46 being a bi-metallic element which is in the closed position when cold, but when heated the element 46 flexes, opening the switch. The switch 48 includes a heating element 52 which is connected between the line 22 and line 20 through switching device 55, suitably a silicon controlled rectifier (SCR). So long as the switch 55 is in the high impedance state, current will not flow through the heating element 52, the thermally actuated switch 48 will remain closed and power will be applied to the load.

A biasing circuit for the SCR 55 is also provided. The biasing circuit can be seen to comprise a diode 54, a resistor 56, a resistor 58 and a resistor 60, each of the elements 54, 56, 58 and 60 being connected in series between the line 20 and the line 22. The juncture 62 is connected through a photocell 64 to the gate electrode of the SCR device 55. A capacitor 66 is connected in shunt with the series connected resistors 58 and 60.

The photocell 64 is of the type that exhibits high resistance when the intensity of ambient light impinging on the cell is low and exhibits relatively low resistance when the ambient light impinging upon a photocell 64 is of high intensity. Thus, at night the resistance of the photocell 64 is high, preventing sufficient gate current flowing through the SCR 55 to cause the SCR 55 to switch to the low impedance state. Current will not, therefore, flow through the heating element 52 of the switch 48 and the element 46 will remain in the closed position, permitting the device 24 to receive gate current to cause it to switch to the low impedance state.

During daylight hours, or in the event of a flash of lightning or headlights striking the photocell 64, the resistance of the photocell 64 will fall to a low value, permitting gate current to flow to the SCR 55 and switching the SCR to the low impedance state from a normally high impedance state in the manner well known in the art. When the SCR device switches to its low impedance state, current will flow through the heating element 52 of the thermally responsive switch 48. The switch 48 is one, however, that requires the heating element 52 to be energized for a minimum period of time, suitably in the order of 20 to 30 seconds, before sufficient heat will be applied to the bi-metallic element 46 to cause the element 46 to bend and open the contacts of switch 48. Also, once the contacts of switch 48 open, a period of time, suitably in the order of 20 seconds, must elapse following the time that the device 55 returns to the high impedance state before the element 46 will cool sufficiently to return to the closed position.

Thus, there is provided a circuit in which power is applied to the load 18 during conditions of darkness, but removed from the load during daylight hours. Further, the circuit is one which prevents momentary removal of the power from the load due to relatively short periods of light impinging upon the photocell 64. The control circuit is thereby rendered insensitve to momentary flashes of light such as produced by lightning or automobile headlights, insuring that the power will be applied to the load substantially during the entire period of darkness.

Figure 4:
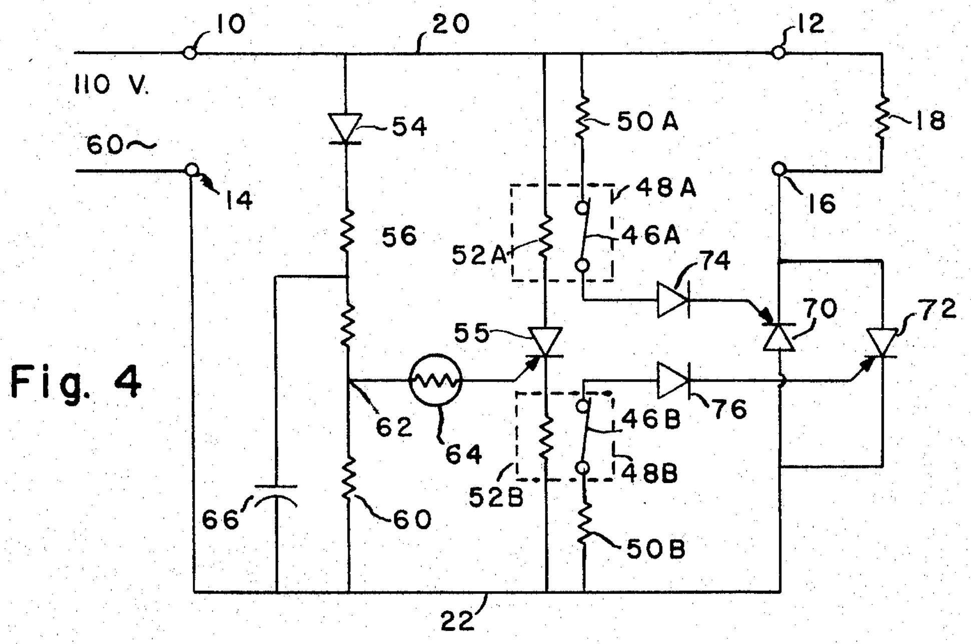
FIGURE 4 illustrates a second embodiment of the invention using a different type of semiconductor device.

Turning now to FIGURE 4 of the drawings, there is shown a control circuit similar to that of FIGURE 1, but which utilizes two oppositely poled SCR devices 70 and 72. The gate electrode of SCR 70 is connected to line 20 through resistor **50*a*, thermally actuated switch 48*a* and diode 74. The gate electrode of SCR 72 is connected to line 22 through diode 76, thermally actuated switch 48*b* and resistor 50*b*. The heating elements of the switches 48*a* and 48*b* are connected in series between lines 20 and 22 through the SCR device 55**.

The operation of the control circuit shown in FIGURE 4 is virtually identical to that described with reference to FIGURE 1. Thus, as long as the SCR device 55 remains in its high impedance state, current will not flow through the heating element of the switches **48*a* and 48*b*, causing the switches to remain closed. So long as the switches 48*a* and 48*b* are closed, gate current will be applied to the proper one of the SCR's 70 and 72 through respective diode devices 74 and 76, causing one of the SCR 70 and 72 to be switched to the low impedance state each half cycle of alternating current supply voltage. Substantially full power will, therefore, be continuously applied to the load. If, however, the heater current should be applied to the switches 48*a* and 48*b* for a sufficient time, switches 48*a* and 48*b* will open, preventing either of the devices 70 and 72** being switched to the low impedance state.

The biasing circuit connected to the gate electrode of SCR 51 is as described with reference to FIGURE 1 and therefore the switches **48*a* and 48*b*** will be closed during the period of darkness but opened during periods of substantial ambient light. However, due to the delay action incorporated in the thermally actuated switches, removal of power as a result of momentary flashes of light is prevented.

Figure 5:
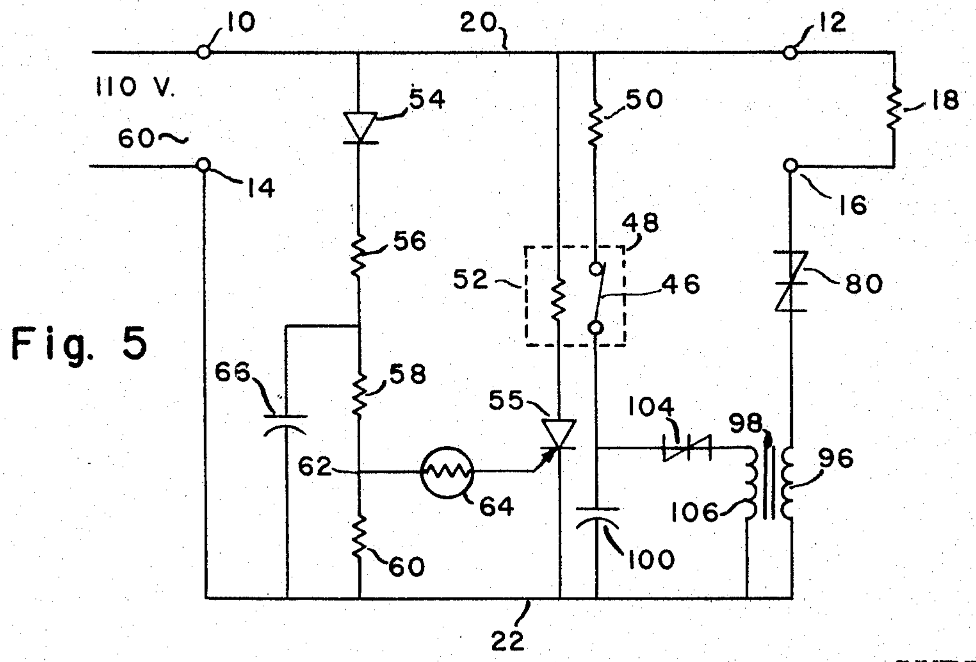
FIGURE 5 is a schematic diagram illustrating still a third embodiment of the invention using a different type of semiconductor device.
Figure 6:
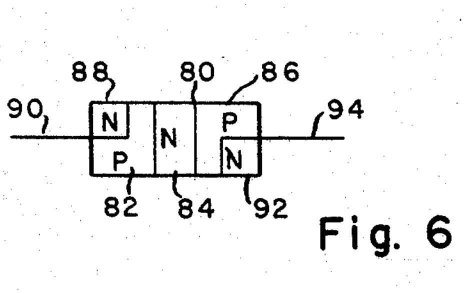
FIGURE 6 illustrates the structure of the semiconductor device utilized in the circuit of FIGURE 5.

Turning now to FIGURE 5 of the drawings, still a third embodiment of the invention is shown in schematic form. The embodiment of the invention shown in FIGURE 5 of the drawings is especially adapted for utilizing a diode device known as the Silicon Symmetrical Switch (SSS) which is indicated by the reference character 80. The diode device 80 is of a configuration as shown in FIGURE 6 and can be seen to comprise three layers 82, 84 and 86 with adjacent layers being of opposite type conductivity. In the example shown, layers 82 and 86 are of P-type conductivity and layer 84 is of N-type conductivity. A region 88 of N-type conductivity is formed in the P-type layer 82 with the electrode 90 contacting both the N-type region 88 and the P-type layer 82. Similarly, an N-type region 92 is formed in the surface of the P-type layer 86 and the electrode 94 contacts both the N-type region 92 and the P-type layer 86.

In operation, the device 80 has voltage current characteristics similar to that of two oppositely poled, parallel connected Shockley diodes. Thus, the voltage current characteristics of the device 80 are as shown in FIGURE 3 wherein the device normally exhibits a high impedance to the flow of current in either direction. When voltage in excess of the avalanche voltage of the device is applied across its terminals, the device will switch to the low impedance state to permit current to flow in a direction dependent upon the polarity of the applied voltage.

Turning now to FIGURE 5 of the drawings, the device 80 is connected in series with the load 18 between line 20 and line 22 through the secondary winding 96 of a transformer 98. The element 46 of the switch 48 is connected in series with the resistor 50 and a capacitor 100 between line 20 and line 22. The juncture 102 between the capacitor 100 and the element 46 of switch 48 is connected through a second SSS device 104 and the primary winding 106 of the transformer 98 to line 22. As described previously, the heating element 52 of the switch 48 is connected in series with the SCR 55 between lines 20 and 22. The biasing network controlling the condition of the SCR 55 is as described previously with reference to FIGURE 1.

Operation of the circuit shown in FIGURE 5 is as follows. When the element 46 of the switch 48 is closed, current will flow through the resistor 50 charging the capacitor 100. When the device 80 has an avalanche voltage considerably in excess of the maximum peak value of the applied alternating current supply voltage and therefore will not be switched to the low impedance state due to the application of the line voltage across its terminals. The device 104 is designed to switch from the normally high impedance state to the low impedance state at a much lower voltage, suitably in the order of 30 to 40 volts. Thus, when the capacitor 100 is charged to a potential in the order of 40 volts, the device 104 will switch to the low impedance state permitting the capacitor 100 to discharge through the primary winding 106 of transformer 98.

As the resistance of the discharge path, the capacitor 100, is very low, a high current pulse will pass through the primary winding 106, inducing a high voltage pulse in the secondary winding 96 which will be sufficient to cause the device 80 to switch to its low impedance state and permit current to flow through the remainder of the half cycle. Since both of the devices 80 and 104 are symmetrical in their switching action, power will be applied to the load 18 during both the half cycles of applied alternating current supply voltage, with the capacitor being charged and discharged in one direction during one half cycle and charged and discharged in the opposite direction during the other half cycle.

Thus, so long as the element 46 of switch 48 remains closed, substantially full power will be applied to the load 18. However, as described previously with regard to embodiments shown in FIGURES 1 and 4, if light impinges upon the photocell 64, the gate current will flow, causing the SCR 55 to switch to the low impedance state, permitting current to flow through the heating element 52 of switch 48. If the current flows through the element 52 for a sufficient time, the element 46 will become heated and open. Once the element 46 opens, the capacitor 100 cannot thereafter become charged and neither the device

104 nor device 80 will be switched to its low impedance state. Therefore, so long as the element 46 is open, power will not be applied to the load 18.

From the foregoing description, it will be seen that the present invention provides a new and improved circuit for controlling the application of power to a load responsive to the existence of a certain condition. One of the features of the invention is that the application of power to the load is not interrupted even though the condition existing may momentarily change.

The circuit is especially adapted for the control of arc type lighting devices in that once power is applied to the lighting device when the ambient light falls below a desired level, momentary flashes of light will not affect the application of power to the load. Since the circuit preferably utilizes solid state devices rather than relay contacts for the switching of substantial amounts of power, greater reliability is attained and maintenance costs are reduced.

Although the invention has only been described with reference to particular preferred embodiments thereof, many changes and modifications will become obvious to those skilled in the art in view of the foregoing description. The foregoing description is intended to be illustrative and not interpreted in a limiting sense, and all such changes and modifications falling within the scope of the appended claims are intended to be covered hereby.

What I claim is:

1. A power control circuit for controlling the power applied to a load from a source of alternating current voltage that comprises:

(a) switching means having two power electrodes, said switching means normally exhibiting a high impedance between said two power electrodes but capable of being excited to a quasi stable low impedance state when a control signal is applied thereto and remaining in said low impedance state until the current flowing through said switching means falls below a minimum level;

(b) means for connecting said switching means in series with a load and a source of alternating current supply voltage;

(c) means including a condition responsive element for generating and applying to said switching means said control signal except when said condition responsive element is subjected to one condition for a minimum period of time; and (d) means including a second condition responsive element for controlling the condition to which the first mentioned condition responsive element is subjected as a function of an ambient condition then prevailing.

2. A power control circuit as defined in claim 1 wherein said first mentioned condition responsive element is a thermally actuated switch.

3. A power control circuit as defined in claim 1 wherein said second condition responsive element is a photosensitive device.

4. A power control circuit as defined in claim 1 wherein said switching means includes at least one gate electrode and wherein said first mentioned condition responsive element comprises a thermally actuated switch connected in series with said gate electrode.

5. A power control circuit as defined in claim 1 wherein said switching means is a diode device and said means including a condition responsive element comprises a transformer having an input winding and an output winding, means connecting the output winding in series with said switching means, a capacitor and a second switching means having a normally high impedance state but capable of being excited to a low impedance state connected in series loop with the input winding of said transformer, and means including said first condition responsive element for providing a charge path for said capacitor.

6. A power control circuit as defined in claim 5 wherein said first mentioned condition responsive element comprises a thermally actuated switch.

7. A power control circuit as defined in claim 1 wherein said first mentioned condition responsive element comprises a thermally actuated switch and wherein said last named means comprises a silicon controlled rectifier connected in series with a heating element for producing said one condition when said silicon controlled rectifier is in the low impedance state, a biasing network for producing a signal of a character to switch said silicon controlled rectifier from a normally high impedance to the low impedance state, and means connecting said second condition responsive element between said biasing network and the gate electrode of said silicon controlled rectifier whereby said silicon controlled rectifier is switched to the low impedance state as a function of the ambient condition then prevailing.

8. A power control circuit as defined in claim 7 wherein said second condition responsive element is a photosensitive element effective to apply biasing current to said silicon controlled rectifier only when said photosensitive element is subjected to light of at least a minimum intensity.

9. A power control circuit as defined in claim 1 wherein said switching means includes at least one gate electrode, wherein said first mentioned condition responsive element comprises a thermally actuated switch connected in series with said gate electrode and wherein said last named means comprises a silicon controlled rectifier connected in series with a heating element for producing said one condition when said silicon controlled rectifier is in the low impedance state, a biasing network for producing a signal of a character to switch said silicon controlled rectifier from a normally high impedance to the low impedance state, and means connecting said second condition responsive element between said biasing network and the gate electrode of said silicon controlled rectifier whereby said silicon controlled rectifier is switched to the low impedance state as a function of the ambient condition then prevailing.

10. A power control circuit as defined in claim 9 wherein said second condition responsive element is a photosensitive element effective to apply biasing current to said silicon controlled rectifier only when said photosensitive element is subjected to light of at least a minimum intensity.

11. A power control circuit as defined in claim 9 wherein said switching means is a gated symmetrical switching device.

12. A power control circuit as defined in claim 9 wherein said switching means is at least one silicon controlled rectifier.

13. A power control circuit as defined in claim 8 wherein said switching means is a diode device and said means including a condition responsive element comprises a transformer having an input winding and an output winding, means connecting the output winding in series with said switching means, a capacitor and a second switching means having a normally high impedance state but capable of being excited to a low impedance state connected in series loop with the input winding of said transformer and means including said thermally actuated switch for providing a charge path for said capacitor.

References Cited

UNITED STATES PATENTS

| | | | |
|---|---|---|---|
| 3,159,755 | 12/1964 | Duncan | 307—88.5 |
| 3,176,189 | 3/1965 | Tabet | 315—158 |
| 3,209,154 | 9/1965 | Maring | 250—206 X |
| 3,294,974 | 12/1966 | Riebs | 250—206 |

OTHER REFERENCES

Electrical Design News, v. 9, #7, p. 115, June 1964.

WALTER STOLWEIN, *Primary Examiner.*